March 15, 1960

R. B. NELSON 2,928,972

ELECTRON TUBE APPARATUS

Filed April 9, 1954

8 Sheets-Sheet 1

FIG_1

RichardB.Nelson
INVENTOR

BY Paul B. Hunter
ATTORNEY

Richard B. Nelson
INVENTOR

BY Paul B. Hunter
ATTORNEY

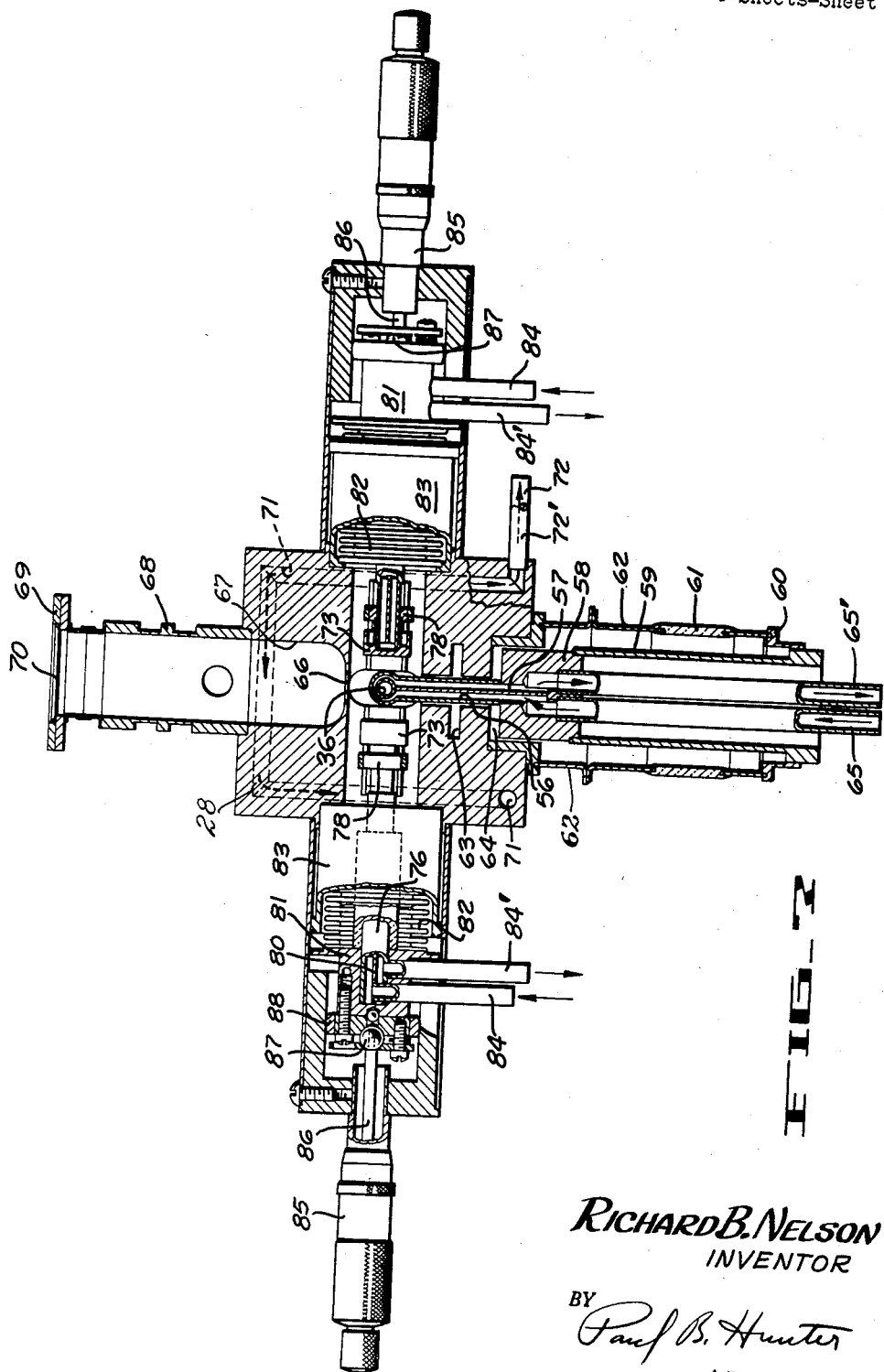

March 15, 1960

R. B. NELSON 2,928,972

ELECTRON TUBE APPARATUS

Filed April 9, 1954

8 Sheets-Sheet 8

RichardB.Nelson
INVENTOR.

BY Paul B. Hunter
ATTORNEY

United States Patent Office 2,928,972
Patented Mar. 15, 1960

2,928,972

ELECTRON TUBE APPARATUS

Richard B. Nelson, Los Altos, Calif., assignor to Varian Associates, San Carlos, Calif., a corporation of California Application April 9, 1954, Serial No. 422,059

7 Claims. (Cl. 313—83)

This invention relates generally, to electron tubes and associated apparatus and the invention has reference, more particularly, to a novel velocity modulation tube of the floating drift tube klystron type and apparatus associated therewith. Klystron tubes of the floating drift tube type have certain inherent advantages in that but a single resonator is employed having both velocity modulation and energy extraction gaps so that in use it is merely necessary to tune this single resonator to tune the tube to a desired frequency. However, these tubes as heretofore constructed have often been unsatisfactory in use owing to excessive heating of the floating drift tube without adequate means for cooling same and also because the tuning range has been somewhat limited.

Another feature of the invention is to provide a novel electron tube of the above character that is of extremely rugged and reliable construction, said tube having a novel focusing cathode structure that is extremely rigid and firmly fixed in relation with respect to the remaining elements of the tube thereby substantially eliminating microphonics.

Another feature is to provide a tube of the above character that uses magnetic focusing of the tube beam together with a specially designed catcher cavity so shaped that, when taking into consideration the space charge repulsion of the electrons of the beam, substantially all portions of the collecting surface of the cavity receive uniform numbers of electrons, thereby eliminating hot spots, the said collector structure having a novel water cooling circulatory system.

Figure 1:
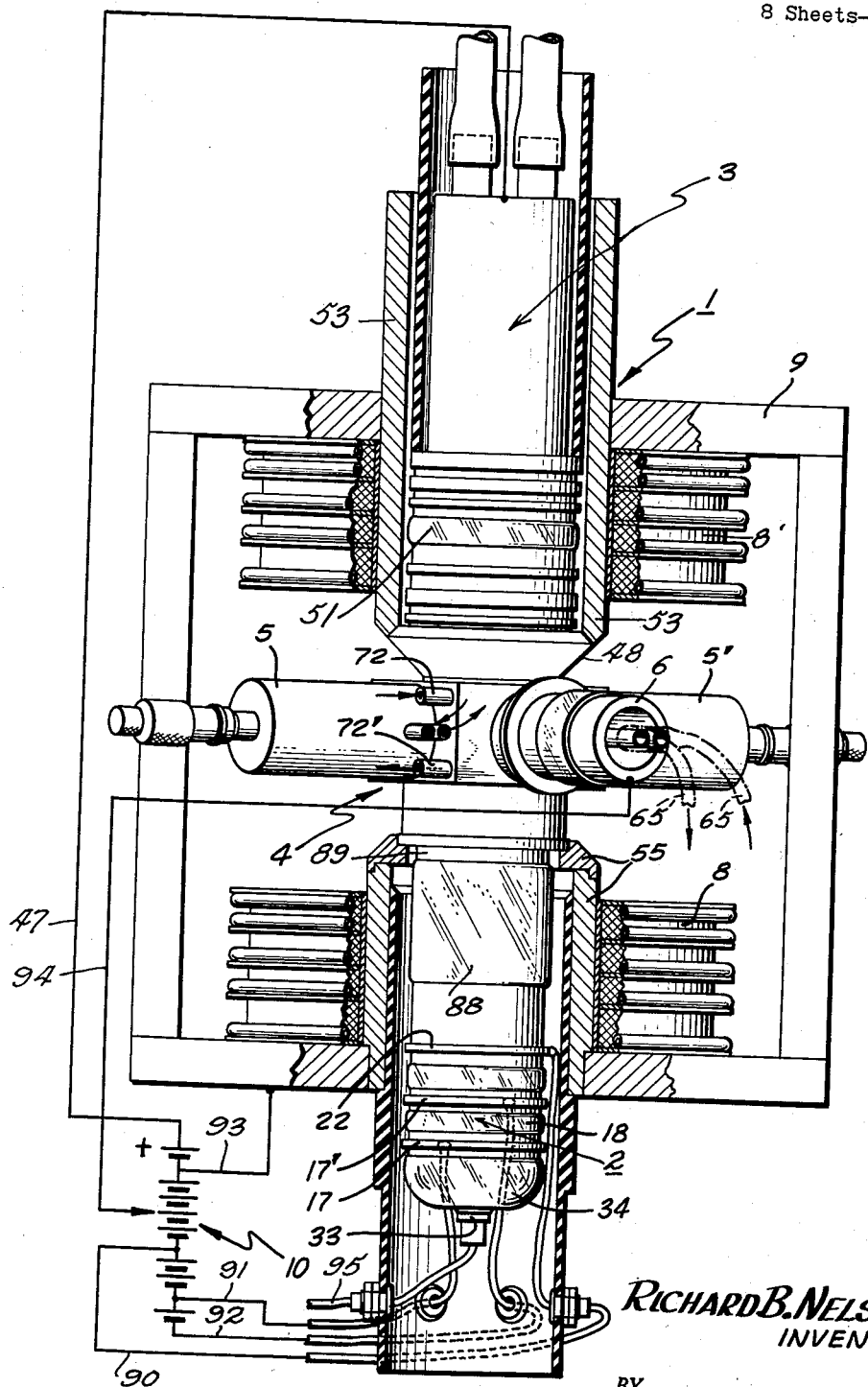
Figure 2:
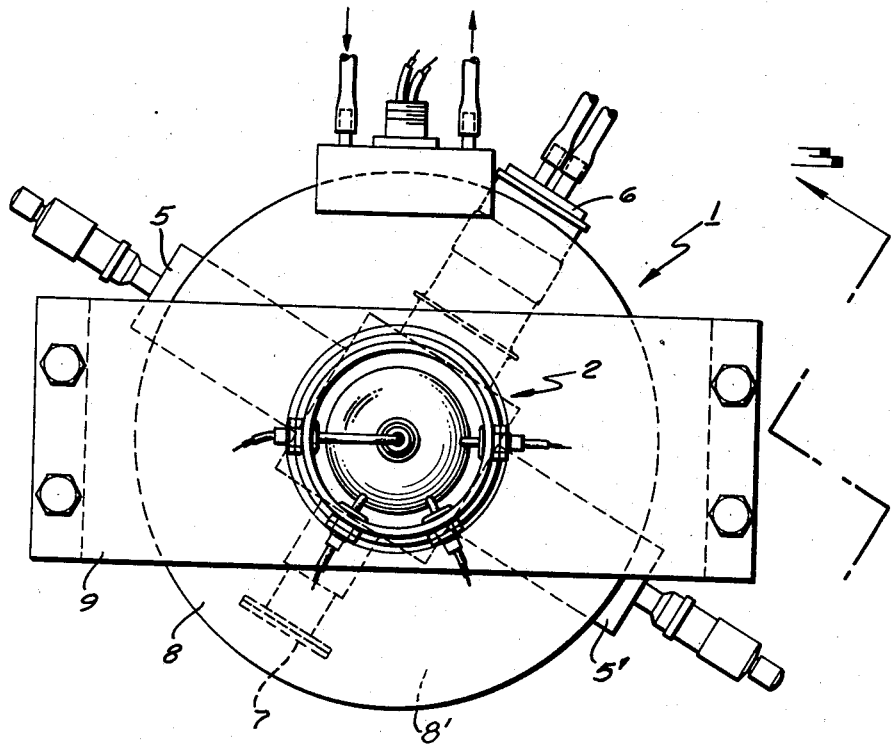
Figure 3:
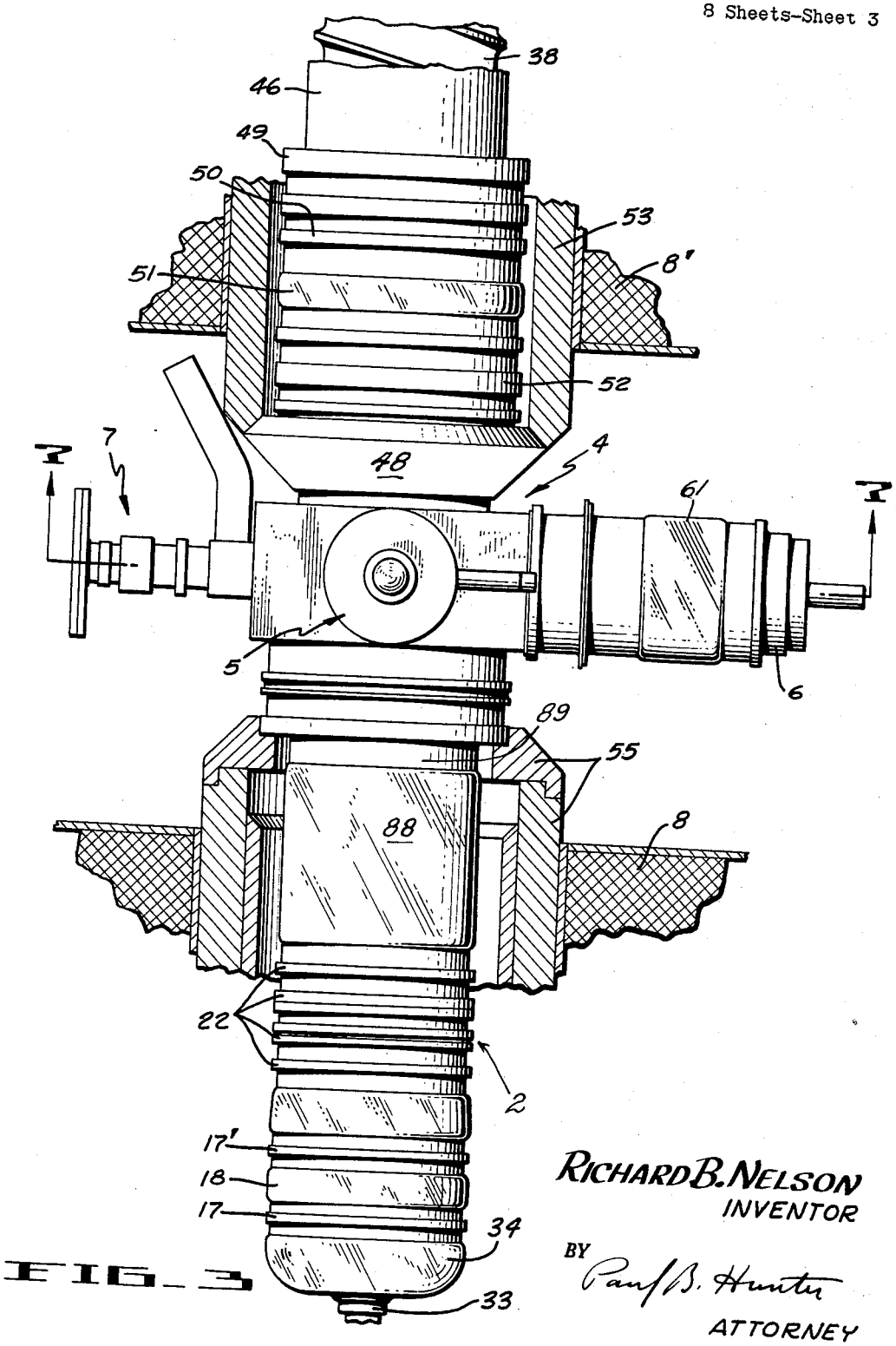
Figure 4:
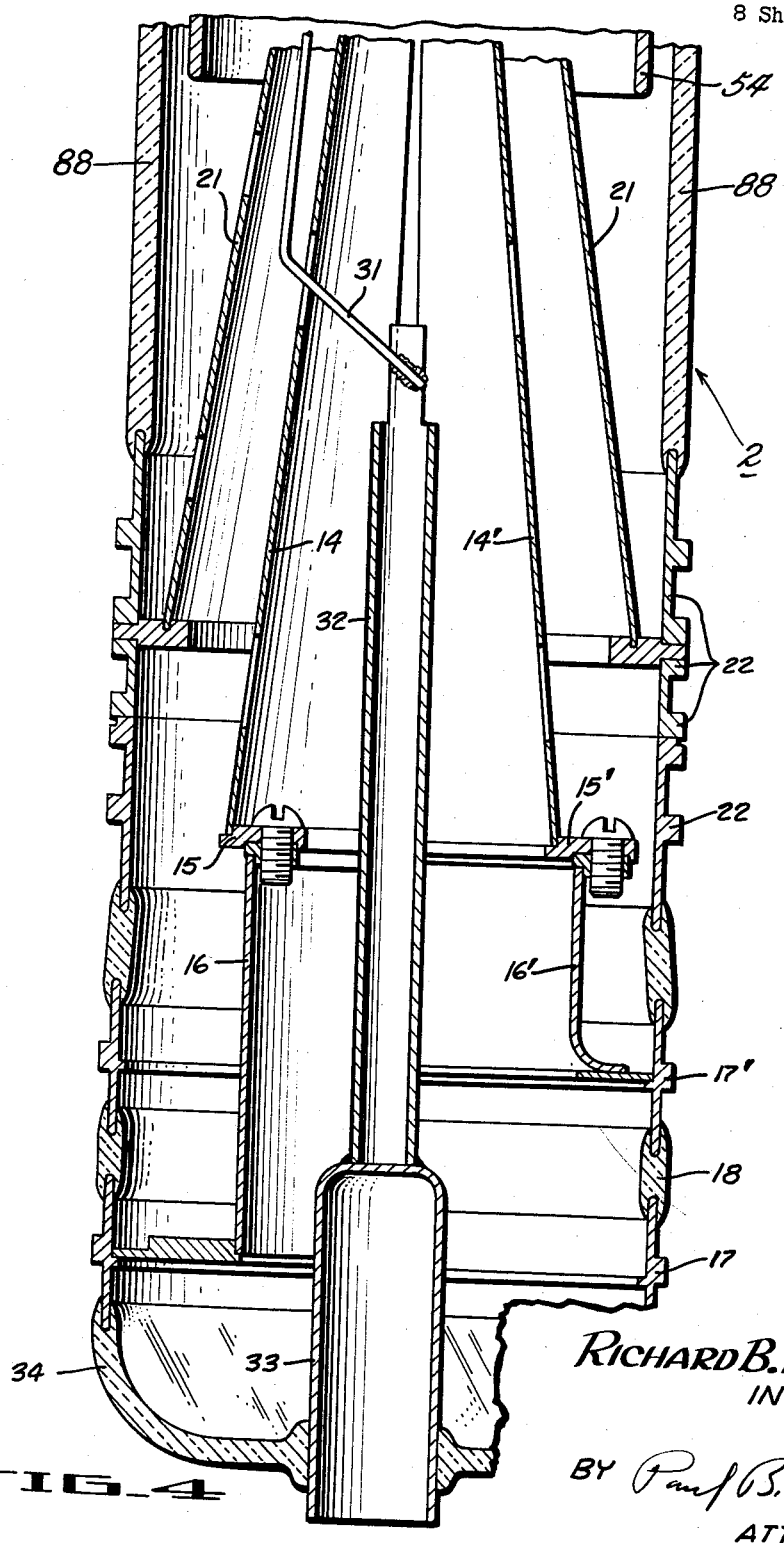
Figure 5:
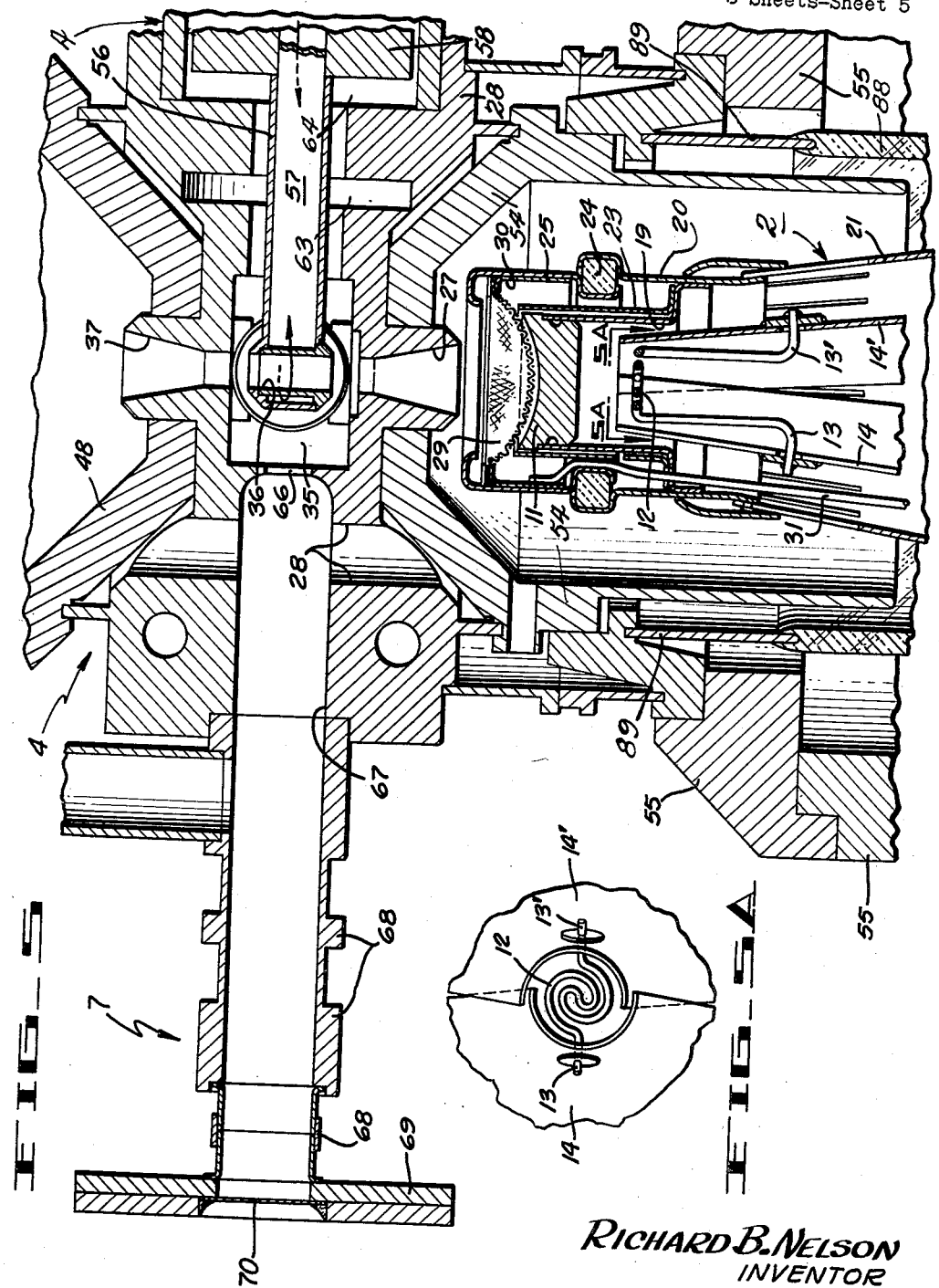
Figure 6:
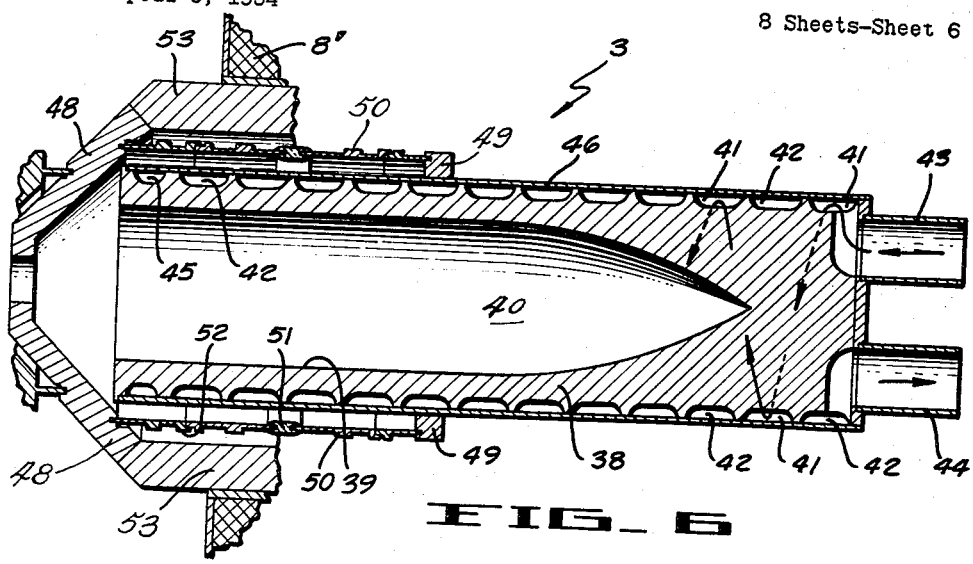
Figure 9:
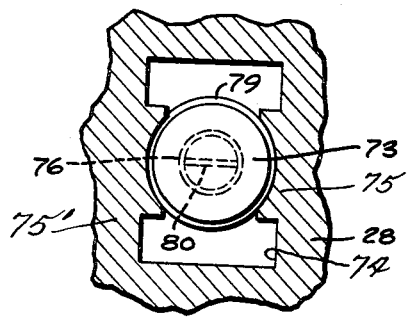
Figure 10A:
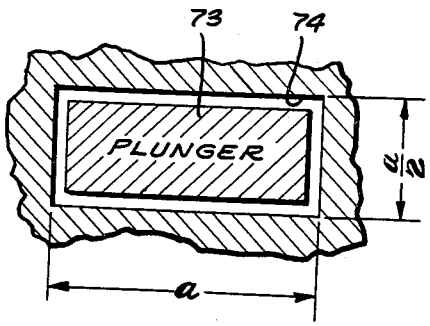
Figure 10B:
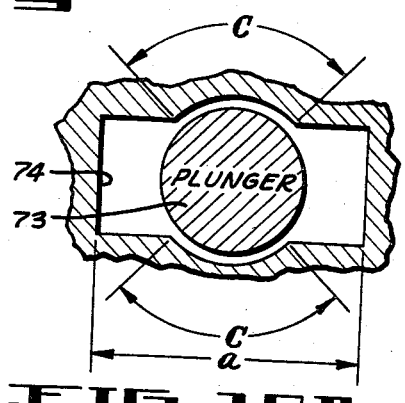
Figure 8:
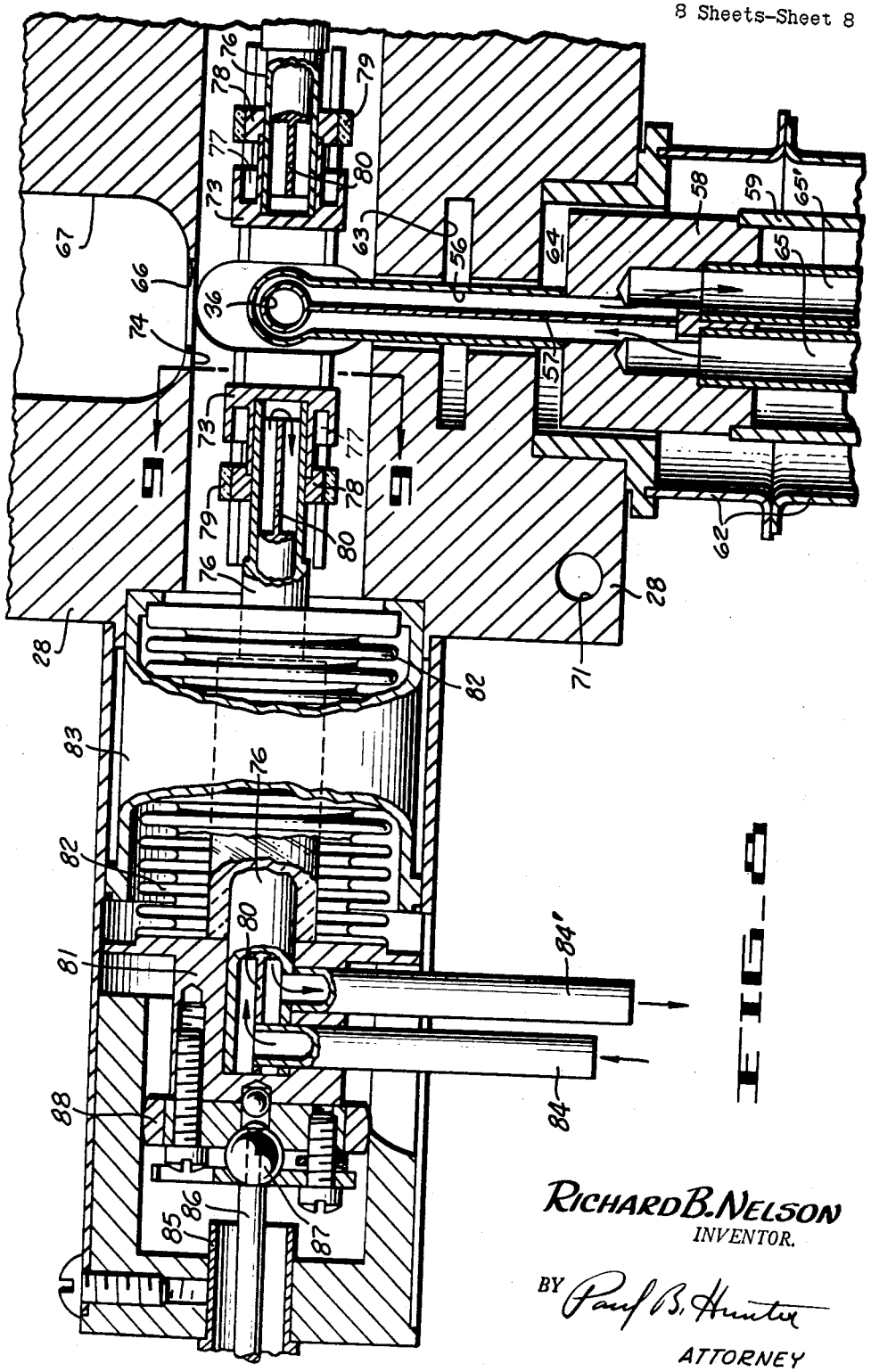

These and other features and advantages of the present invention will be more apparent after a perusal of the following specification taken in connection with the accompanying drawings wherein, Fig. 1 is an elevational view with parts broken away of the novel electron tube and associated apparatus of the present invention, Fig. 2 is a plan view from the bottom of the structure on Fig. 1, Fig. 3 is a fragmentary view of the apparatus shown in Fig. 1, the view being taken along the lines 3—3 of Fig. 2 looking in the direction of the arrows, Fig. 4 is an enlarged longitudinal sectional view of a portion of the structure of Fig. 3, Fig. 5 is an enlarged longitudinal sectional view of another portion of the structure of Fig. 3, Fig. 5A is a detailed sectional view along 5A—5A of Fig. 5, Fig. 6 is a longitudinal sectional view of still another portion of the structure of Fig. 3, Fig. 7 is a sectional view taken along line 7—7 of Fig. 3 looking in the direction of the arrows, Fig. 8 is an enlarged fragmentary view of a portion of the structure of Fig. 7, Fig. 9 is an enlarged sectional view taken along the line 9—9 of Fig. 8, and Figs. 10A and 10B are schematic views for illustrating the theory of operation of the tuning plunger.

Similar characters of reference are used in the above figures to designate corresponding parts.

Referring now to Figs. 1 and 2 of the drawings, reference numeral 1 designates the novel electron tube and associated apparatus of this invention, said tube comprising essentially a cathode assembly 2, a collector assembly 3, a resonator assembly 4, tuning assemblies 5 and 5', floating drift tube supporting structure 6, waveguide output feed 7, focusing coil assemblies 8 and 8', core and supporting frame member 9, and power supplies 10.

Referring to Figs. 3, 4 and 5, the cathode assembly 2 is shown consisting of a concave focusing cathode button 11 as of thoriated tungsten, said button being indirectly heated by electron bombardment from a thermionic filament 12 spaced downwardly from button 11. One side of the filament 12 has a connecting lead 13 that is supported upon and electrically connected to a substantially semifrusto-conical sheet metal support 14 (see also Fig. 5A) as of molybdenum. The other side of the filament has a supporting lead similarly extending downwardly at 13' that is connected to a similar semifrusto-conical sheet metal support 14'. As shown in Fig. 5A these semifrusto-conical supports slightly overlap without contacting each other whereby they serve to prevent undesired outward radiation of heat and electrons from the filament 12. The members 14 and 14' extend downwardly and are respectively rigidly connected to substantially semiannular separated plates 15 and 15' which in turn are respectively connected by tubular members 16 and 16' as of kovar to electrically independent annular contact rings 17 and 17' also of kovar which are retained in assembled relation though electrically separated by an annular glass seal 18. The power supply 10 supplies operating potentials to the tube elements through cathode lead 90, filament leads 91 and 92, resonator lead 93, drift tube lead 94, and collector lead 47.

The cathode button 11 is supported upon a tubular support 19 as of tantalum that is flared out at its lower end and flanged and secured upon a second tubular support 20 which has its lower portion rigidly connected as by welding to hollow semifrusto-conical supporting member 21 as of molybdenum which has its lower end carried by an annular contact ring assembly 22. Ring assembly 22 and the cathode assembly of which it is a part are carried by the body of the tube and secured thereto through cathode insulating ring 88 and annular ring element 89. The cathode button tubular support 19 is shown surrounded by a tubular heat shield 23 carried by tube 19 to prevent radial emission of heat from the button and from the filament. The upper portion of tubular support 20 is formed to retain an annular insulating member 24 as of ceramic which in turn supports an annular cathode focusing member 25. The member 25 is shown of tubular construction with an inwardly overhanging free end for directing the electrons into the flared throat 27 of the resonator housing 28. An amplitude modulating grid 29 of concave configuration to conform to the cathode button is shown carried by a tubular member 30 as of tantalum confined within and carried by the focusing member 25 so that this latter member and grid 29 are at the same potential. Members 25 and 30 are electrically connected by a lead 31 to a tubular conductor 32 terminating at 33, carried by glass seal 34 and having an external focusing and modulating potential supply lead 95.

As thusly constructed the cathode button 11, heating filament 12, grid 29 and focusing electrode 25 are all rigidly supported within the tube stem of cathode assembly 2 so that the tube is substantially nonmicrophonic.

Also, the concentric arrangement of the various tubular members provides adequate heat shielding of the cathode and filament. The electron beam leaving the cathode 11 and passing through throat 27 of the resonator housing enters the cavity resonator 35 and passes through the velocity modulation gap of the resonator into the hollow drift tube 36. Drift tube 36 is of the floating kidney type in that it is supported within the resonator 35 without actually dividing this resonator into two resonators. Thus, the space between one end of the drift tube 36 and the beam ingress opening 27 constitutes the velocity modulation region of the single resonator 35 and the space between the other end of the drift tube and the exit throat 37 constitutes the energy extraction region of this resonator. The exit throat 37 is flared oppositely to that of the ingress throat 27 to accommodate a diverging beam.

Thus, the beam leaving the cathode button 11 will converge as it passes within throat 27 reaching its minimum diameter in the gaps of resonator 35 and will start to expand as it enters throat 37, the configuration of this throat accommodating this expansion. Beyond the throat 37 the beam passes on and into the collector 38. The collector 38 is of substantially cylindrical shape and may be made of copper or other good conducting metal and has a beam receiving cylindrical recess 39 terminating in a curved portion 40 of progressively decreasing diameter. In order to eliminate hot spots from forming in this collector it is desirable that the curve as shown at 40 possess a shape such that all portions of this area will receive equal quantities of electrons in operation. It can be shown that with a uniform parallel beam entering the field three collector space the spread of the beam under space charge forces results in the electrons following paths described by the equation:

$$Z = 2\int_0^{(\ln R)^{1/2}} e^{u^2} du$$

where $$R = \frac{r}{r_0}$$

($r$=radius of electron path which entered at radius $r_0$)

$$Z = 174 \frac{I^{1/2}}{V^{3/4}} \frac{z}{r_0},$$

$z$=axial distance from source,
$I$=current inside radius $r_0$, and
$V$=beam voltage.

From the above information a plot can be made of the curve 40 such that uniform power density obtains in use over substantially the entire surface of the concavely curved outer end portion of the cavity 39. It will be noted that the cavity 39 has substantially the shape of a projectile shell as shown in Fig. 6.

For further aid in preventing overheating of the collector 38 the same is provided with double helical peripheral coolant conveying grooves 41 and 42. The lead of the helical grooves 41 and 42 along the length of collector 38 is twice the pitch of these grooves whereby each groove is independent of the other. Thus a coolant such as water entering a tube 43 communicating with groove 41 will pass along the periphery of the collector 38 in helical fashion until the same reaches an annular groove 45 at the inner end of the collector. From the annular groove 45 the coolant flows into helical groove 42 and passes backwardly along the periphery of the collector 38 in helical fashion until this coolant emerges into exit tube 44. A cylindrical sleeve 46 fitting snugly on the collector 38 serves to retain the coolant during its passage around the collector.

To still further prevent overheating of the collector the same is preferably operated at a potential somewhat higher than that of the resonator assembly 4. This is better shown in connection with Fig. 1 wherein the collector lead 47 is shown connected to power supply 10 at a more positive potential than that of the resonator assembly. In this way positively charged ions forming within the cavity 39 of the collector are repelled towards the wall of the resonator assembly and hence are not allowed to collect in sufficient quantity to focus the beam within the collector and cause the same to burn out the end wall of the collector adjacent the pointed end of the recess 39—40. The collector is supported from a substantially conical pole piece 48 of magnetic material attached to the resonator body. This is accomplished by use of a supporting ring 49 secured upon the tube 46 substantially midway of the length thereof and connected through sleeve member 50, glass seal 51 and sleeve member 52 to the pole piece 48. The seal 51 serves to insulate the collector assembly from the pole piece 48 and the tube resonator.

The pole piece 48 carries a hollow cylindrical armature 53 upon which is mounted focusing coils 8' (see also Fig. 1). Similarly a substantially conical pole piece 54 is attached to the resonator housing 28 in surrounding relation to the ingress throat 27 and is connected to a cylindrical armature 55 carrying focusing coils 8. The magnetic path for coils 8 and 8' is through armature 55, pole piece 54 through the cavity resonator, pole piece 48, armature 53 and back to armature 55 via the supporting frame structure 9.

The drift tube 36 is rigidly supported within the cavity 35 in spaced relation with respect to the walls of the cavity and with respect to the throats 27 and 37 by means of a hollow rectangular arm 56 having a central dividing septum 57 (see particularly Figs. 5 and 8). The arm 56 is carried by a cylindrical block 58 that in turn is carried by a tubular member 59 extending outwardly from the body of the tube. The outer end portion of member 59 is connected in turn through a sleeve assembly 60 and through a vitreous seal 61 and sleeve structure 62 to the resonator housing 28 so that in effect the arm 56 carrying the drift tube 36 is rigidly supported through the various members mentioned upon the resonator housing through thoroughly insulated therefrom by the seal 61. This insulated drift tube feature forms the subject matter of a co-pending divisional application.

Thus it is possible to supply an independent voltage to the drift tube 36 so that this drift tube may be held at a voltage different from that of the cavity resonator. This is desirable in the tube of the present invention inasmuch as it is desired to tune the same over a wide range and this range is enhanced by being able to vary the potential on the drift tube with respect to the rest of the resonator, i.e. the resonator block 28. This resonator block or housing 28 is formed with an annular recess 63 surrounding the support arm 56 substantially a quarter wavelength of the operating frequency from the hollow resonator 35 so that this recess acts as a quarter wave trap to prevent the escape of electromagnetic energy outwardly of the resonator and in surrounding relation to the arm 56. The spacing of block 58 from the cavity housing provides a second trap at 64 for this purpose to further prevent the escape of energy.

Circulating cooling fluid is supplied to the drift tube 36 via circulating tubes 65 and 65' carried by the block 58 which block is suitably bored to communicate with the hollow interior of arm 56, the septum 57 serving to separate the ingoing coolant from the outgoing coolant. The coolant is carried inwardly within the arm 56 and circulates around the drift tube in the manner shown by the arrows in Fig. 8 so that this tube is kept cool in use regardless of the number of electrons striking the same. The resonator 35 is provided with an energy output opening 66 feeding into a waveguide opening 67 provided in the resonator block or housing 28. The waveguide opening 67 communicates with a waveguide structure 68 extending outwardly from the housing 28 and provided with an end flange 69 carrying a sealing window 70. The flange 69 is adapted to be attached to a waveguide flange for conveying energy to a load. The resonator housing 28 of substantially block form is provided with coolant circulating passages 71 communicating with water coolant ingress and exit pipes 72 and 72' whereby this housing is maintained in a cool condition in use.

The cavity is tuned by use of novel dual tuning means of similar construction. As especially shown in Figs. 7, 8, 9 and 10, these tuners comprise a choke-plunger movable short circuits. The tuner forms the subject matter of a co-pending divisional application.

In Fig. 9 the novel choke-plunger 73 is shown in detail. This plunger is of cylindrical cross-section and is movable within a waveguide 74 without touching the walls of the guide. The upper and lower walls of the guide are formed with centrally located projections 75 and 75' which substantially conform to the peripheral contour of the plunger without actually touching the same. The plunger 73 has a length equal to substantially a quarter wavelength of the operating frequency of the resonator thereby providing a quarter wave trap at the point where the plunger supporting rod 76 extends outwardly from the plunger. Also the plunger is undercut at 77 (Fig. 8) and this undercut cooperates with a bearing support 78 to provide a second quarter wave trap to prevent the escape of energy outwardly which would otherwise tend to flow owing to the concentric line structure of the plunger 73 and guide 74. The bearing support 78 is preferably of metal such as Monel metal or copper provided with a vitreous coating at 79 acting as a bearing upon the curved surfaces of the projections 75 and 75' of the waveguide.

The plunger rod 76 is made hollow and is provided with a central dividing septum 80 serving to conduct cooling fluid along the rod to the end thereof for cooling the plunger 73. The outer end portion of the plunger rod 76 extends into and is carried by a cylindrical block 81 to which the outer end of a Sylphon or bellows 82 is sealed, the inner end of the bellows being sealed to the inner end of a sleeve 83 carried by the resonator housing 28. Thus, the vacuum of the resonator extends into the interior of the bellows 82. The outer end portion of rod 76 is provided with coolant tubes 84 and 84' which permit coolant fluid to flow from one of these tubes through plunger 76 around the end of septum 80 within choke 73 and back out through tube 84'.

The assembly consisting of choke-plunger 73, plunger rod 76 and block 81 is adapted to be moved longitudinally to effect the tuning of resonator 35. A micrometer screw 85 is employed for this purpose and the stem 86 thereof has a ball 87 secured to its inner end which ball sets within a socket member 88 attached to the end of block 81 so that as the micrometer screw 85 is adjusted the plunger 73 is moved gradually along the guide 74. The dual tuning means located on the opposite side of the cavity is identical with the tuning means just described and hence the parts thereof are similarly numbered.

The action of the choke-plunger 73 in effecting tuning may be better described by a consideration of Fig. 10A. In this figure, 74 represents a conventional waveguide with a height of approximately ½ its width. An ordinary rectangular choke-plunger is shown in this waveguide which plunger has a uniform clearance around its periphery. The circumference of the transmission line provided by the space between this plunger and the periphery of the guide is essentially $3a$ where $a$ is the guide width. In addition to the coaxial TEM mode this transmission line will propagate all TE modes whose free space wavelength is less than $$\frac{3a}{n}$$

where $2n$ is the number of field nodes for the mode in question. Since the waveguide is customarily used for wavelengths larger than, but approaching $a$, it will be seen that the plunger section can propagate the modes corresponding to $n=1$ and $n=2$. There are two each of these modes so a total of five modes are propagated.

In designing the novel cylindrical plunger 73 of this invention parasitic resonances in all these modes are avoided, bearing in mind that such resonances not only cause a large dissipation of energy but may result in overheating of the plunger and waveguide surfaces. In 10B there is shown schematically the novel tuning plunger and associated waveguide of this invention. It will be noted that the central portion of the waveguide is deformed as by use of a cylindrical bore slightly larger than plunger 73 as shown in the figure or by use of projections such as 75 and 75' shown in Fig. 9 having opposed surfaces of cylindrical shape so that a low impedance short circuit is provided across the guide in the region of high electric field. This plunger section will propagate the TEM mode and the principal $TE_{1,0}$ mode. Such energy is reflected back into the resonator by the quarter wave section of the plunger 73. At frequencies for which the semicircumference of low impedance section indicated by $c$ in 10B is less than a half wavelength as is true in the design of tuner of the present invention, no other TE modes can be propagated. Thus, for the normal frequency range of the waveguide we have only the $TE_{1,0}$ mode which we are using and the coaxial TEM mode which is always possible in a choke-plunger but which consumes substantially no energy when used in the plunger design of this invention. The reason that no other transmission line modes are present in the structure shown in 10B is because of the large change of impedance taking place at the ends of the upper and lower low impedance sections $c$ bearing in mind that the sections at the opposite sides of the plunger have high impedance owing to the large gap present. The structure of 10B is also easier to manufacture than that of 10A because a cylindrical plunger and cylindrical bores are relatively economical to make. In the practical embodiment of the tube shown in the drawings, it was possible to vary the frequency of the tube from 7.5 kmc. to 11.5 kmc. by using the dual tuning means of this invention, which is a relatively enormous tuning range for a power klystron.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electron tube apparatus including a cathode assembly disposed substantially at one end of the tube and comprising, a cathode button, a thermionic emitter filament for heating said cathode button by electron bombardment and having the opposite ends thereof connected respectively to semifrusto-conical metallic supporting members disposed within said cathode assembly at substantially one end of the tube apparatus and said supporting members having overlapping though noncontacting edges whereby said members serve to convey heating current to said filament and to rigidly support said thermionic emitter filament.

2. A cathode assembly as defined in claim 12 wherein said cathode button is concave and includes, a tubular support for said button, a concave modulating grid conforming to said button, a tubular support for said modulating grid and a frusto-conical support connected to said tubular supports substantially at one end of said tubular supports and disposed within said cathode assembly substantially at one end of the tube apparatus for rigidly positioning said cathode button and said grid with respect to said filament.

3. In an electron tube apparatus, a cathode assembly comprising a base element consisting of alternate annular conducting and insulating members, concentrically disposed frusto-conical supporting members rigidly connected respectively to said conducting annular members, and cathode elements supported upon said frusto-conical members whereby a rigid support for said elements is provided.

4. An electron tube apparatus including a cathode assembly disposed substantially at one end of the tube apparatus and comprising a thermionic electron emitter, a pair of hollow frusto-semiconical supporting members disposed within the cathode assembly and at substantially one end of the tube apparatus and positioned on opposite sides of said emitter connected respectively thereto and supporting the same, said supporting members having their free end portions projected beyond said emitter for focusing electrons emitted therefrom, said supporting members having noncontacting side edges whereby said members are insulated from each other and serve to convey electrical current to said emitter, said members also serving to convey excess heat from said focusing end portions away from said emitter to prevent the overheating of these end portions.

5. In an electron tube apparatus, a cathode assembly comprising a cathode vacuum envelope, an annular extension of said cathode envelope extending inwardly of said envelope, a hollow frusto-conical support coupled to said inward extension, a first tubular support carried by said frusto-conical support concentrically disposed and extending outwardly thereof, a tubular cathode emitter support coupled to said first tubular support and concentrically disposed therewithin, an annular electrical insulator coupled to said first tubular support, a second tubular support coupled to said electrical insulator, a modulating grid coupled to said second tubular support and contained therewithin, and an extension of said second tubular support extending outwardly of said modulating grid thereby forming a focusing electrode.

6. In an electron tube apparatus, a cathode assembly comprising a hollow frusto-conical support, a first tubular support coupled to said frusto-conical support and extending outwardly of said conical support, a second tubular support coupled to said first tubular support, an insulator interposed between said first and said second tubular supports thereby allowing different electrical potentials to be established between said first and said second tubular supports, a modulating grid carried by said second tubular support and contained therewithin and an extension of said second tubular support extending outwardly of said modulating grid thereby providing a focusing electrode.

7. In an electron tube apparatus, an electron collector comprising a cylindrical member having an electron receiving cavity therein, said cavity comprising an initial cylindrical portion and a terminating concavely curved converging portion, said converging portion being so curved that a uniform parallel beam of electrons having trajectories parallel to the side walls of said cylindrical portion entering said cavity and spreading under space charge forces will dissipate electrons over said curved surface substantially uniformly, said cylindrical member having coolant conveying helical grooves on its peripheral surface, the lead of said grooves being twice their pitch, sleeve means covering said cylindrical member for retaining coolant within said grooves, and means for supplying coolant so as to pass along said cylindrical member in one direction through one of said grooves and then to pass in the opposite direction along the other of said grooves to effect cooling of said member.

References Cited in the file of this patent

UNITED STATES PATENTS

| | | |
|---|---|---|
| Re. 22,580 | Mouromtseff et al. | Dec. 19, 1944 |
| 2,078,360 | Ziegenbein | Apr. 27, 1937 |
| 2,177,703 | Francis | Oct. 31, 1939 |
| 2,239,416 | Ehrenberg | Apr. 22, 1941 |
| 2,250,511 | Varian et al. | July 29, 1941 |
| 2,284,405 | McArthur | May 26, 1942 |
| 2,396,802 | Mouromtseff et al. | Mar. 19, 1946 |
| 2,398,829 | Haeff | Apr. 23, 1946 |
| 2,410,822 | Kenyon | Nov. 12, 1946 |
| 2,457,194 | Anderson | Dec. 28, 1948 |
| 2,146,541 | Hansell | Feb. 7, 1949 |
| 2,510,639 | Koch | June 6, 1950 |
| 2,521,545 | Shepherd | Sept. 5, 1950 |
| 2,680,209 | Veronda | June 1, 1954 |
| 2,687,490 | Rich et al. | Aug. 24, 1954 |
| 2,761,106 | Posin | Aug. 28, 1956 |
| 2,789,246 | Wang | Apr. 16, 1957 |
| 2,794,143 | Warnecke et al. | May 28, 1957 |
| 2,812,468 | Robertson | Nov. 5, 1957 |
| 2,825,842 | Kenyon | Mar. 4, 1958 |
| 2,833,955 | Marchese | May 6, 1958 |

UNITED STATES PATENT OFFICE

CERTIFICATE OF CORRECTION

Patent No. 2,928,972                          March 15, 1960

Richard B. Nelson

It is hereby certified that error appears in the printed specification of the above numbered patent requiring correction and that the said Letters Patent should read as corrected below.

Column 3, line 32, for "three" read -- free --; column 4, line 9, for "accomplised" read -- accomplished --; line 16, for "carries" read -- mates with --; column 6, line 62, for the claim reference numeral "12" read -- 1 --.

Signed and sealed this 8th day of November 1960.

(SEAL)
Attest:

KARL H. AXLINE                          ROBERT C. WATSON
Attesting Officer                         Commissioner of Patents